US010757634B2

(12) United States Patent
Nader et al.

(10) Patent No.: US 10,757,634 B2
(45) Date of Patent: Aug. 25, 2020

(54) BROADCASTING SYSTEM INFORMATION IN A WIRELESS COMMUNICATION SYSTEM

(71) Applicant: Telefonaktiebolaget LM Ericsson (publ), Stockholm (SE)

(72) Inventors: Ali Nader, Malmö (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/061,170

(22) PCT Filed: Dec. 20, 2016

(86) PCT No.: PCT/SE2016/051291
§ 371 (c)(1),
(2) Date: Jun. 11, 2018

(87) PCT Pub. No.: WO2017/119838
PCT Pub. Date: Jul. 13, 2017

(65) Prior Publication Data
US 2018/0359682 A1 Dec. 13, 2018

Related U.S. Application Data

(60) Provisional application No. 62/276,528, filed on Jan. 8, 2016.

(51) Int. Cl.
*H04W 48/10* (2009.01)
*H04L 12/18* (2006.01)
(Continued)

(52) U.S. Cl.
CPC .......... *H04W 48/10* (2013.01); *H04L 12/189* (2013.01); *H04L 12/1895* (2013.01); *H04L 41/0813* (2013.01); *H04W 68/005* (2013.01)

(58) Field of Classification Search
CPC ............... H04W 48/10; H04W 68/005; H04L 41/0813; H04L 12/189; H04L 12/1895
See application file for complete search history.

(56) References Cited

U.S. PATENT DOCUMENTS 9,001,723 B1 * 4/2015 Singh .................... H04W 24/00
370/312
2006/0030342 A1 * 2/2006 Hwang ................. H04W 68/00
455/466

(Continued)

FOREIGN PATENT DOCUMENTS

EP   1553798 A1   7/2005
EP   2445284 A1   4/2012
EP   2640109 A1   9/2013

OTHER PUBLICATIONS

"SI Change for NB-IOT", 3GPP TSG RAN WG2 Meeting NB-IOT ad-hoc, R2-160469, Budapest, Hungary, Jan. 18-22, 2016, pp. 1-6.

*Primary Examiner* — Andrew Lai
*Assistant Examiner* — Harry H Kim
(74) *Attorney, Agent, or Firm* — Sage Patent Group

(57) ABSTRACT

A radio network node (12) notifies wireless communication devices (14) in a wireless communication system (10) about an upcoming change of broadcasted system information. In this regard, the radio network node (12) broadcasts current system information (16A). The radio network node (12) also generates a notification (18) indicating that the radio network node (12) will broadcast changed system information (16B). This notification (18) is generated to indicate how the changed system information (16B) will differ from the current system information (16A). The radio network node (12) moreover transmits the notification (18) and, after transmitting the notification (18), broadcasts the changed system information (16B).

18 Claims, 11 Drawing Sheets

(51) Int. Cl.
*H04W 68/00* (2009.01)
*H04L 12/24* (2006.01)

(56) References Cited

U.S. PATENT DOCUMENTS

| | | | |
|---|---|---|---|
| 2007/0058592 A1* | 3/2007 | Kim | H04W 72/042 |
| | | | 370/335 |
| 2007/0287440 A1* | 12/2007 | Benkert | H04W 24/04 |
| | | | 455/422.1 |
| 2010/0265935 A1* | 10/2010 | Okada | H04W 84/18 |
| | | | 370/350 |
| 2011/0268014 A1 | 11/2011 | Mildh et al. | |
| 2013/0094424 A1* | 4/2013 | Dhanda | H04W 4/06 |
| | | | 370/312 |
| 2013/0258938 A1* | 10/2013 | Sagfors | H04W 48/12 |
| | | | 370/312 |
| 2015/0004924 A1* | 1/2015 | Kim | H04W 28/0247 |
| | | | 455/404.1 |
| 2018/0359044 A1* | 12/2018 | Pirskanen | H04B 7/0617 |
| 2019/0132390 A1* | 5/2019 | Chakraborty | H04L 67/1095 |

* cited by examiner

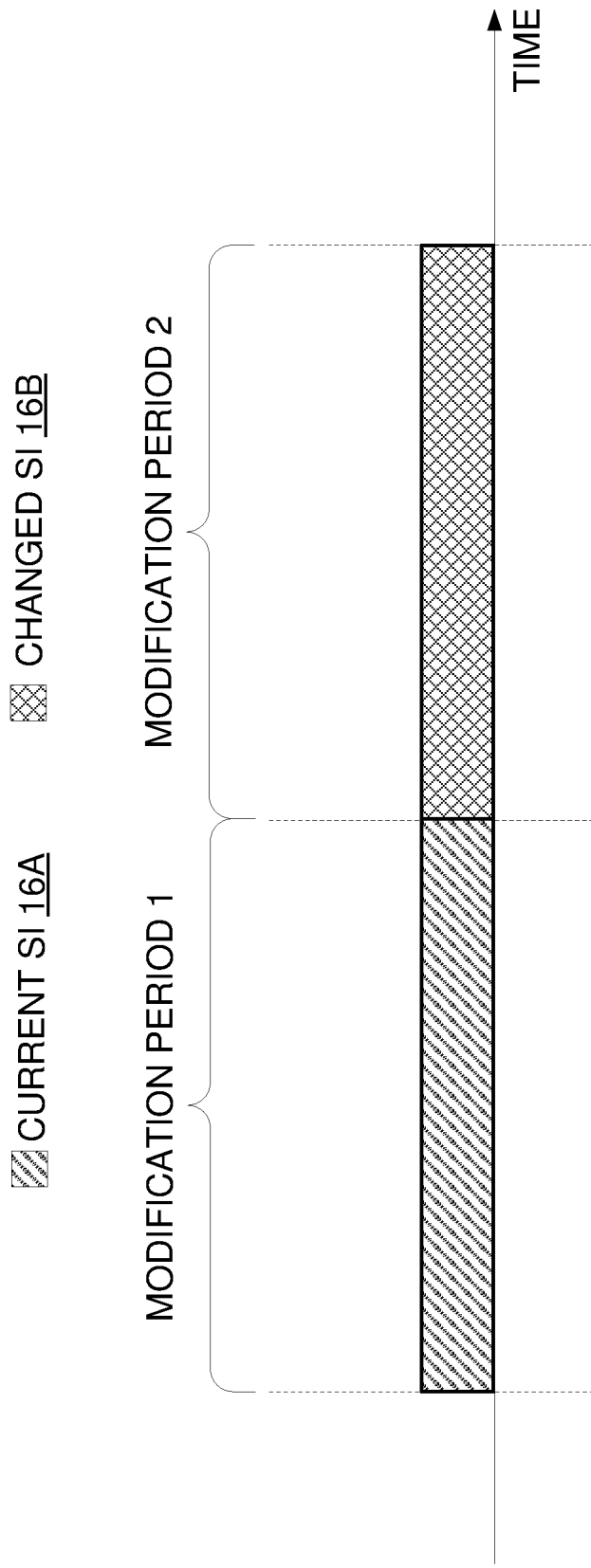

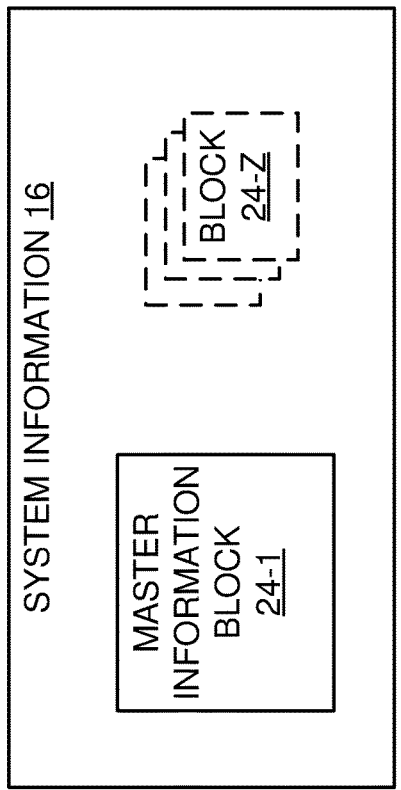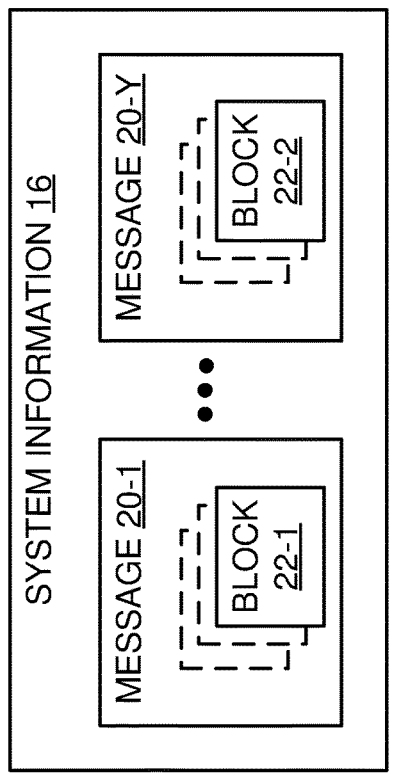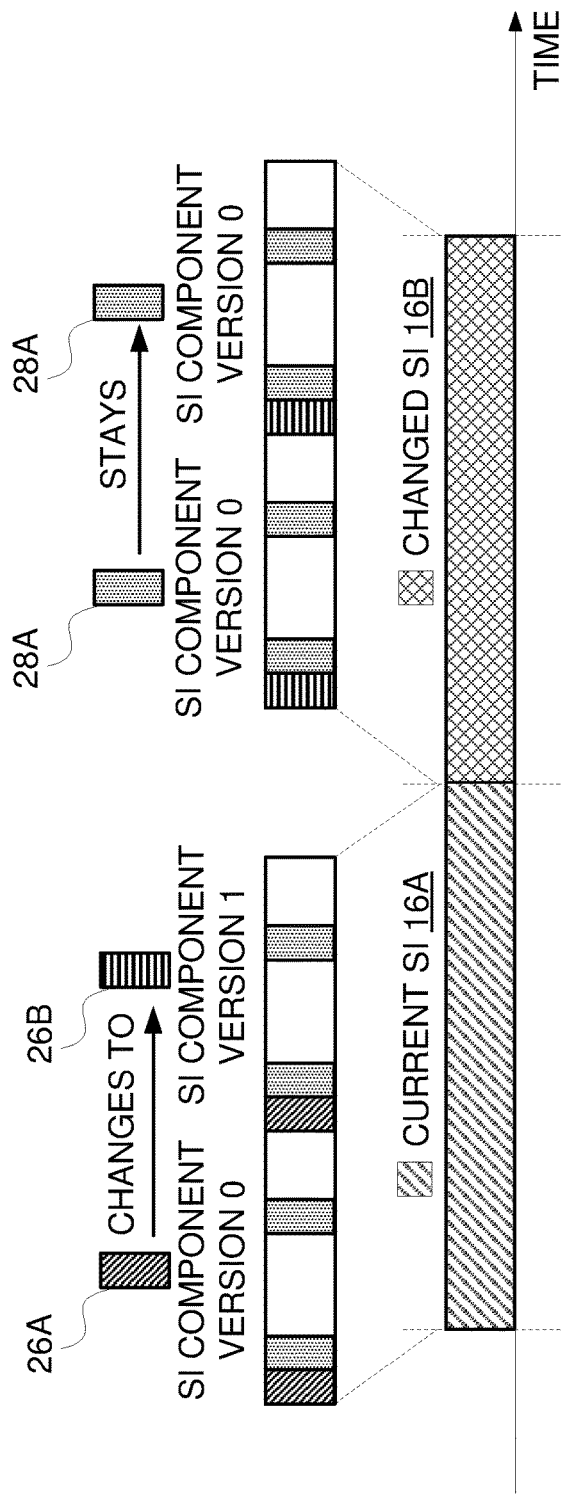
FIG. 4A
FIG. 4B
FIG. 4C

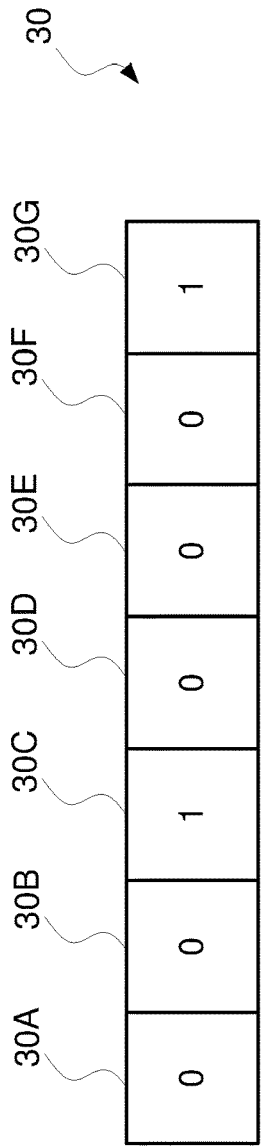
FIG. 6A
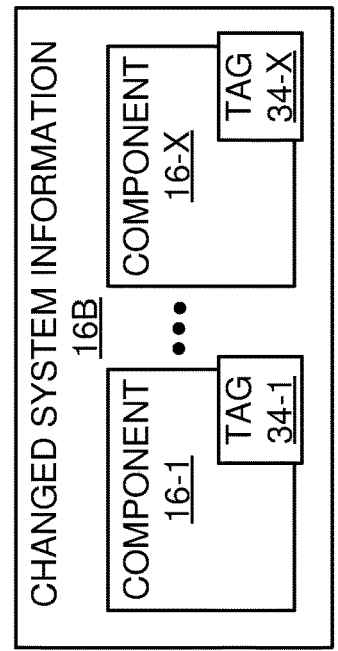
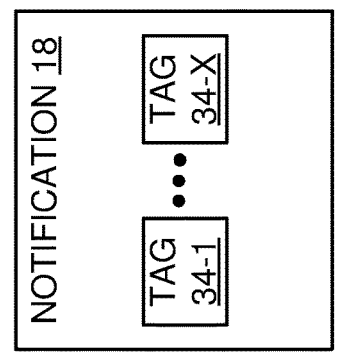
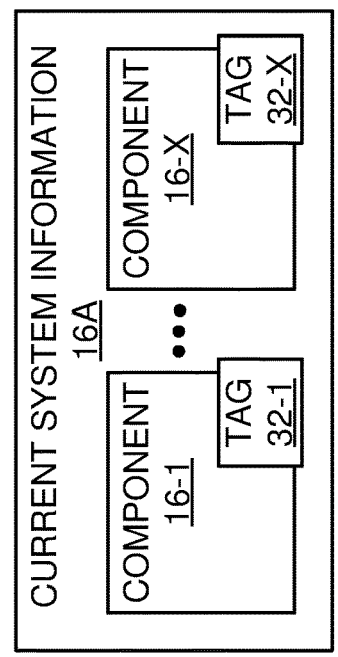
FIG. 6B

BROADCASTING SYSTEM INFORMATION IN A WIRELESS COMMUNICATION SYSTEM

RELATED APPLICATIONS

This application claims priority to U.S. Provisional patent Application Ser. No. 62/276,528 filed Jan. 8, 2016, the entire contents of which are incorporated herein by reference.

TECHNICAL FIELD

The present application relates generally to system information in a wireless communication system, and more particularly to a radio network node broadcasting such system information to wireless communication devices.

BACKGROUND

A wireless communication system broadcasts so-called system information to wireless communication devices in order to assist those devices with operating in the system. System information includes, for example, parameters that describe general information about the system, including the Public Land Mobile Network (PLMN) ID, the system bandwidth, and the like. System information also includes parameters that describe information specific to certain cells in the system, such as the allocation of control channels, paging channel information, cell selection information, and so on.

System information may change from time to time. Known approaches effectively inform devices about such a change by embedding one or more tags in the system information itself. A device reads the system information in order to check the tag(s). If the tag(s) have changed, the device considers the system information to have changed and continues on with reading the system information.

Systems with scarce radio resources and/or devices with limited battery power complicate these known approaches for informing devices about changed system information. Embedding change tags in the system information itself requires devices to consume battery power in order to read the tags. Furthermore, the tags themselves consume radio resources.

SUMMARY

Embodiments herein include a method implemented by a radio network node for notifying wireless communication devices in a wireless communication system about an upcoming change of broadcasted system information. The method comprises broadcasting current system information. The method also includes generating a notification indicating that the radio network node will broadcast changed system information. This notification is generated to indicate how the changed system information will differ from the current system information. The method also includes transmitting the notification, and, after transmitting the notification, broadcasting the changed system information.

Embodiments herein further include a method implemented by a wireless communication device configured for operation in a wireless communication system, the method comprising receiving current system information broadcasted from a radio network node. The method also comprises receiving a notification indicating that the radio network node will broadcast changed system information, and indicating how the changed system information will differ from the current system information. The method further comprises determining, based on the notification, an extent to which the wireless communication device will read the changed system information when broadcasted. The method moreover comprises selectively reading the changed system information to the determined extent.

In at least some embodiments, notifying a wireless communication device about how the system information will change prior to and apart from broadcasting that changed system information advantageously enables the device to avoid reading the changed system information at all, e.g., if the change relates to system information not currently of interest to the device. This in turn means the device is able to turn off its receiver(s), enter sleep mode, or otherwise configure itself to conserve battery power rather than reading the changed system information.

More generally, though, selective reading of the changed system information by the wireless communication device in some embodiments comprises reading the changed system information only when it is determined to read the changed system information to at least some extent, and refraining from reading the changed system information when it is determined to not read the changed system information to any extent.

In some embodiments, determining the extent to which the device will read the changed system information comprises determining to read only some of multiple different system information components indicated by the notification as differing between the current system information and the changed system information.

Alternatively or additionally, determining the extent to which the device will read the changed system information comprises determining one or more types of system information indicated by the notification as differing between the changed system information and the current system information, and determining which, if any, of the one or more types of system information are desired types of system information in which the wireless communication device has an interest in updating. Determination then comprises determining to read only the desired types of system information, if any.

In any of these embodiments, the current system information and the changed system information may each include scheduling information indicating in which radio resources different system information components are broadcasted. In this case, the method at the device may further comprise, responsive to determining that the notification does not indicate that the scheduling information included in the changed system information differs from the scheduling information included in the current system information, reading one or more components of the changed system information using the scheduling information included in the current system information.

In some embodiments, reading the changed system information may comprise performing channel estimation using a portion of the changed system information indicated by the notification as not differing from a corresponding portion of the current system information.

In any of the above embodiments at the radio network node or the device, the current system information and the changed system information may each comprise multiple different system information components. In this case, the notification may indicate which one or more system information components will differ between the current system information and the changed system information.

In one embodiment, for example, the notification includes a bitmap with different bits dedicated to respectively indicating whether different system information components will differ between the current system information and the changed system information.

Alternatively or additionally, the current system information may include, for each system information component, a value tag associated with a current version of that system information component. In this case, the notification may include, for each system information component that will differ between the current system information and the changed system information, a value tag that differs from the value tag included for that system information component in the current system information.

In one such embodiment, at least some of the value tags for respective system information components have different lengths. In this case, for example, a value tag for a system information component that is changed more often may have a longer length than a value tag for a system information component that is changed less often.

Alternatively or additionally, the value tags may have respective lengths that are configurable, subject to the value tags collectively having a defined length that is shared amongst the value tags.

Note that at least one of the value tags may have a length of zero. In any event, a length of a tag value may comprise a bit length.

In some embodiments, the current system information and the changed system information each comprise multiple different system information messages as the multiple different system information components, wherein each system information message includes one or more system information blocks. Alternatively, in other embodiments, the current system information and the changed system information each comprise multiple different system information blocks as the multiple different system information components, wherein each system information block is included in one of multiple different system information messages.

In any of the above embodiments, the current system information and the changed system information may each comprise a master information block containing system information deemed essential for wireless communication devices to connect to the wireless communication system. In this case, the notification may indicate whether the master information block will differ between the current system information and the changed system information.

In any of the above embodiments, the wireless communication system may be a narrowband Internet of Things (NB-IoT) system or an enhanced machine type communication (eMTC) system.

Embodiments herein further include a method implemented by a radio network node for broadcasting system information to wireless communication devices in a wireless communication system. The method comprises generating system information to comprise multiple system information components and to include value tags respectively indicating versions of the system information components, wherein at least some of the value tags have different lengths. The method also comprises broadcasting the system information.

Embodiments also include a method implemented by a wireless communication device configured for operating in a wireless communication system. The method comprises receiving from a radio network node system information that comprises multiple system information components and that includes value tags respectively indicating versions of the system information components, wherein at least some of the value tags have different lengths. The method further includes, based on the value tags, determining whether the respective system information components have changed since having previously received system information, and selectively reading system information components that have changed.

In at least some embodiments, the ability to broadcast system information with value tags of different lengths facilitates the tailoring of those lengths in a way that conserves radio resources. In one or more embodiments, for example, a system information component that is changed more often has a longer tag length than a system information component that is changed less often. The shorter length tag in this regard may consume fewer radio resources to signal than the longer length tag.

In some embodiments, tag length information is transmitted from the radio network node to one or more wireless communication devices. The tag length information may indicate lengths of the value tags included in the system information.

In one embodiment, for example, the tag length information is included in the system information.

Alternatively or additionally, the tag length information is included as part of a message that conveys scheduling information indicating in which radio resources system information components are respectively broadcasted.

Alternatively or additionally, where the system information components are successively ordered, the tag length information may comprise a bitmap with different successive sections of the bitmap marked off by a marker bit value. In this case, bit lengths of the successive sections of the bitmap may indicate respective lengths of the successively ordered system information components.

Alternatively or additionally, the tag length information may comprise an index into a table defining different possible tag length configurations of the system information components.

Alternatively or additionally, the tag length information comprises, for each system information component, a value of a variable in a function that defines a length of the tag value for that system information component.

In any of the above embodiments, a value tag for a system information component that is changed more often may have a longer length than a value tag for a system information component that is changed less often.

In any of the above embodiments, the value tags may have respective lengths that are configurable, subject to the value tags collectively having a defined length that is shared amongst the value tags.

In any of the above embodiments, at least one of the value tags may have a length of zero.

In any of the above embodiments, a length of a tag value may comprise a bit length.

In any of the above embodiments, the system information may comprise multiple system information messages as the multiple system information components, wherein each system information message includes one or more system information blocks. Alternatively, the system information may comprise multiple system information blocks as the multiple system information components, wherein each system information block is included in one of multiple system information messages.

In any of the above embodiments, the wireless communication system may be a narrowband Internet of Things (NB-IoT) system or an enhanced machine type communication (eMTC) system.

Embodiments herein also include corresponding apparatus, computer programs, and associated carriers.

BRIEF DESCRIPTION OF THE DRAWINGS

FIG. 3 is a block diagram of a time structure for applying system information changes during or at the start of predefined modification periods, according to some embodiments.

FIG. 4A is a block diagram of system information components according to some embodiments.

FIG. 4B is a block diagram of system information components according to other embodiments.

FIG. 4C is a block diagram of system information transmission at scheduled times according to some embodiments.

FIG. 6A is a block diagram of a bitmap indicating whether different system information components have changed, according to some embodiments.

FIG. 6B is a block diagram of a notification that includes value tags for indicating changed system information according to some embodiments.

DETAILED DESCRIPTION

Figure 1:
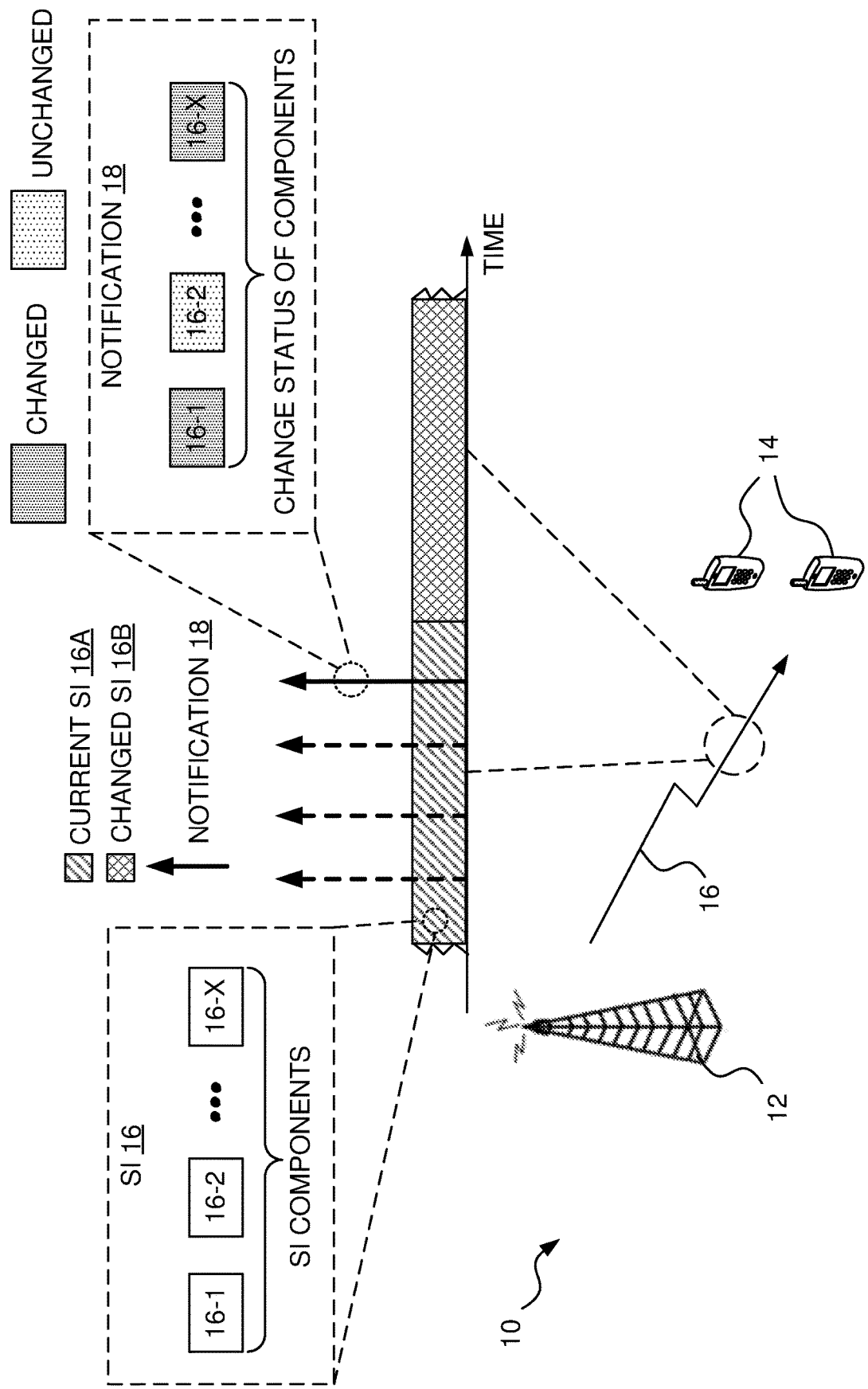
FIG. 1 is a block diagram of a wireless communication system that includes a radio network node and a wireless communication device according to some embodiments.

FIG. 1 illustrates a radio network node 12 and wireless communication devices 14 in a wireless communication system 10, e.g., a narrowband Internet of Things (NB-IoT) system or an enhanced machine type communication (eMTC) system. The radio network node 12 broadcasts so-called system information (SI) 16 to the wireless communication devices 14 in order to assist those devices 14 with operating in the system 10. This system information 16 may change from time to time. The radio network node 12 notifies the wireless communication devices 14 about such changes.

According to some embodiments, the radio network node 12 does so by indicating not only that the system information 16 will change, but also how the system information 16 will change. To do so, the radio network node 12 in some embodiments implements the processing 100 shown in FIG. 2A.

Figures 2A, 2B:
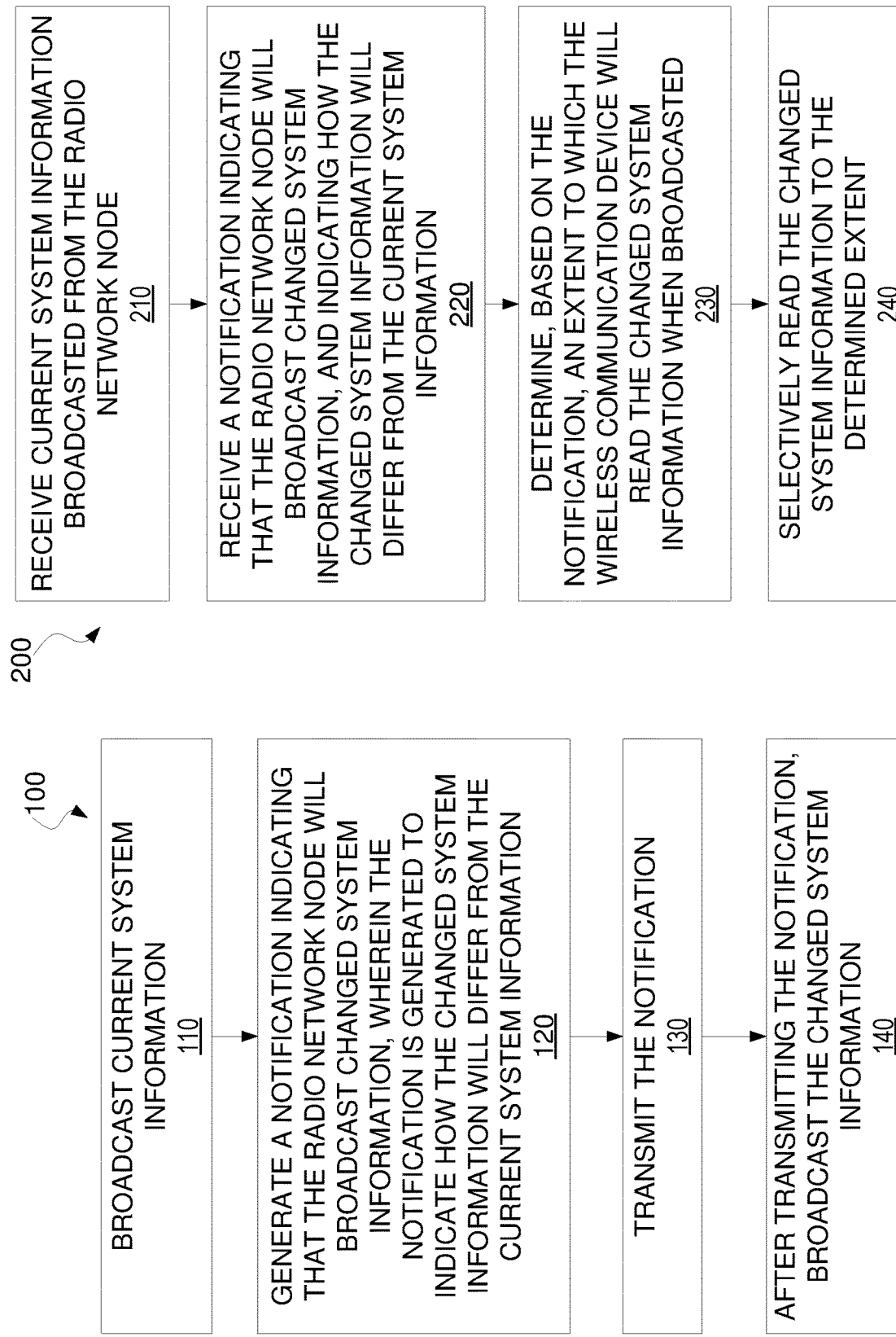
FIG. 2A is a logic flow diagram of a method performed by a radio network node according to some embodiments.
FIG. 2B is a logic flow diagram of a method performed by a wireless communication device according to some embodiments.

As shown in FIG. 2A in conjunction with FIG. 1, the radio network node 12 broadcasts current system information 16A; that is, system information that is being applied in the system 10 currently within a particular time period prior to the change (Block 110). The radio network node 12 generates a notification 18 indicating that changed system information 16B will be broadcasted (Block 120).

In at least some embodiments, for example, the radio network node 12 and devices 14 are configured to only apply system information changes during or at the start of predefined modification periods that recur periodically. The notification 18 in such a case indicates that the changed system information 16B will be broadcasted at the start of the next modification period, e.g., as shown with brief reference to FIG. 3.

Regardless of exactly when the changed system information 16B will be broadcasted, the radio network node 12 notably generates the notification 18 to indicate how the changed system information 16B will differ from the current system information 16A. The radio network node 12 transmits this notification 18 (Block 130). As shown in FIG. 1, for example, the radio network node 12 broadcasts the notification 18 within one or more messages (e.g., paging messages or downlink control information (DCI) messages) prior to when the changed system information 16B will be broadcasted. Regardless, after transmitting the notification 18, the radio network node 12 broadcasts the changed system information 16B.

FIG. 2B illustrates corresponding processing 200 by a wireless communication device 14 according to some embodiments. As shown, the device 14 receives current system information 16A broadcasted from the radio network node 12 (Block 210). The device 14 also receives the notification 18 indicating that the radio network node 12 will broadcast changed system information 16B, and indicating how (e.g., in what ways) the changed system information 16B will differ from the current system information 16A (Block 220). The device 14 determines, based on the notification 18, an extent to which the device 14 will read the changed system information 16B when broadcasted (Block 230). The device 14 may for instance determine to read none, only some, or all of the changed system information 16B. The device 14 then selectively reads the changed system information 16B to this determined extent (Block 240).

In some embodiments, for example, the device 14 reads at least some of the changed system information 16B when the device 14 determines to read that information 16B to at least some extent. But the device 14 refrains from reading any of the changed system information 16B when the device 14 determines not to read the changed system information 16B to any extent.

In at least some embodiments, therefore, notifying a wireless communication device 14 about how the system information will change prior to and apart from broadcasting that changed system information 16B advantageously enables the device 14 to avoid reading the changed system information 16B at all, e.g., if the change relates to system information not currently of interest to the device 14. This in turn means the device 14 is able to turn off its receiver(s), enter sleep mode, or otherwise configure itself to conserve battery power rather than reading the changed system information 16B.

For example, a wireless communication device 14 in some embodiments determines one or more types of system information indicated by the notification 18 as differing between the changed system information 16B and the current system information 16A. The device 14 then determines which, if any, of the one or more types of system information are desired types of system information in which the device 14 has an interest in updating. If at least one desired type of system information is indicated as having changed, the device 14 reads the changed system information 16B, but only to the extent needed to retrieve the desired type(s) that have changed. However, if no desired type of system information is indicated as having changed, the device 14 refrains from reading the changed system information 16B.

One type of system information in this regard may pertain to information needed for accessing a cell served by the radio network node 12. If the notification 18 indicates that this cell access information differs between the changed system information 16B and the current system information 16A, the device 14 may refrain from reading the changed system information 16B if the device 14 does not desire to access the cell, e.g., within a certain time after the change is to be broadcasted.

Another type of system information pertains to neighbor cell relations. The notification 18 may indicate that an update related to neighbor cell relations is to be broadcasted at a time during which a device 14 desires to transmit data. Especially where the device's operation is half-duplex, the device 14 may refrain from reading the changed system information 16B in favor of transmitting if the device 14 is experiencing good channel conditions in its current serving cell and has no interest in updating its neighbor cell relations. This not only conserves the device's battery power, but also avoids unnecessary delay to the transmission.

In at least some embodiments, system information 16 comprises multiple different system information components, shown in FIG. 1 as components 16-1, 16-2, . . . 16-X. In this case, the notification 22 may indicate how the changed system information 16B will differ from the current system information 18 by indicating which one or more of the system information components will differ between the changed system information 16B and the current system information 16A. FIG. 1 as an example shows that the notification 18 indicates components 16-1 and 16-X will differ between the changed system information 16B and the current system information 16A, but that component 16-2 will remain the same.

With the notification indicating changes on a component by component basis, the device 14 scrutinizes the extent to which it will read the changed system information 16B on a component by component basis as well. Accordingly, the device 14 in some embodiments determines to read only some of the different system information components, e.g., those indicated by the notification as differing between the changed system information 16B and the current system information 16A.

Moreover, the system information components may correspond to different types of system information, thereby revealing to the device 14 which types of system information will differ. In this case, the device 14 may identify whether any of the system information components indicated as differing correspond to a type of system information in which the device 14 has an interest in reading. The device 14 may then selectively read only those components that differ and that correspond to a desired system information type. Continuing the above examples, for instance, the device 14 may read a component corresponding to cell access system information, but not read neighbor cell relation system information even if it is indicated as differing.

A system information component in this regard is any part or portion of system information 16, at any granularity or resolution. FIGS. 4A-4B show different examples of system information components.

As shown in FIG. 4A, system information 16 comprises multiple different system information message 20-1 . . . 20-Y. Each system information message 20 includes one or more system information blocks. Message 20-1 is shown as including one or more blocks, including block 22-1. Message 20-Y is shown as including one or more blocks as well, including block 22-2. A system information block (SIB) in some embodiments groups together system information (e.g., in the form of information elements) that are of the same nature. A system information message may serve as a container for one or more system information blocks.

At one level of granularity, system information components 16-1 . . . 16-X are system information messages 20-1 . . . 20-Y. In this case, the notification 18 indicates which system information messages will differ between the changed system information 16B and the current system information 16A. At a lower level of granularity, though, system information components 16-1 . . . 16-X are system information blocks 22-1, 22-2 . . . 22-Z. In this case, the notification 18 indicates which system information blocks will differ between the changed system information 16B and the current system information 16A. These embodiments may also be combined, such that the notification 18 indicates which system information messages and which system information blocks will differ between the changed system information 16B and the current system information 16A.

Additionally or alternatively, FIG. 4B illustrates system information 16 as comprising a so-called master information block (MIB) 24-1. A master information block contains system information deemed (most) essential for wireless communication devices 14 to connect to the system 10 and/or acquire other information from the cell. The MIB may have fixed scheduling known to all devices 14 in the system 10. The system information 16 may also include one or more other system information blocks 24-Z, etc. Regardless, the notification 18 in some embodiments indicates whether the master information block will differ between the changed system information 16B and the current system information 16A.

Figure 5:
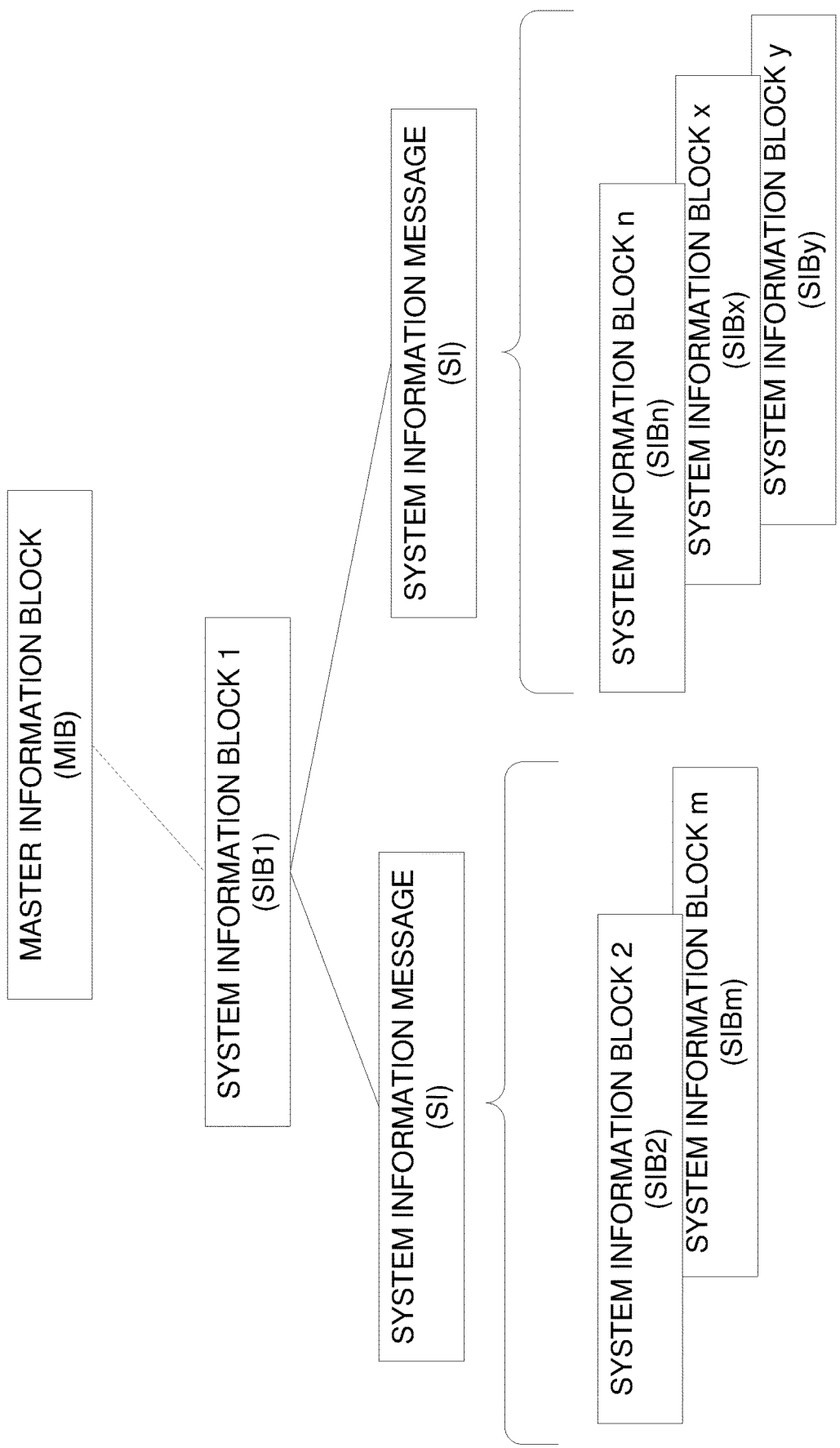
FIG. 5 is a block diagram of the hierarchical organization of system information according to some embodiments.

In at least some embodiments described in the context of NB-IoT, system information 16 is organized as depicted in FIG. 5, as a tree with the Master Information Block (MIB) on the top containing only the most essential parameters. In one or more embodiments, the MIB is broadcast on the physical broadcast channel (PBCH). Regardless, the remainder of the system information is broadcast in System Information Blocks (SIB) on the physical DL shared Channel (PDSCH). A SIB groups together information elements of the same nature. SIB1 is a special SIB that holds scheduling information for SI messages containing one or more SIBs other than SIB1. The SIB scheduling information may be provided in the MIB or known apriori to devices 14 as fixed scheduling information. A device 14 in some embodiments may read system information 16 by first capturing the MIB, then SIB1, and then the remainder of the SIBs with the help of information provided in SIB1. In this and other cases where the system information components comprise MIB, SIB1, and/or other SIBs, the notification 18 may be referred to as a so-called MIB/SIB/SI-change-indicator.

No matter the particular granularity of the system information components, though, some components may differ between the changed and current system information, whereas other components may not differ. FIG. 4C illustrates this in a context where the system information 16 is not transmitted continuously, but rather is transmitted at one or more designated or scheduled times (e.g., within any given modification period). As shown, one SI component 26 changes in version between the current system information 16A and the changed system information 16B, e.g., from version 0 to version 1. By contrast, another SI component 28 does not change in version between the current system information 16A and the changed system information 16B, e.g., it stays at version 0.

In any event, the notification 18 may indicate which component(s) (e.g., messages and/or blocks) differ in any number of ways. For instance, in some embodiments, the notification 18 includes a bitmap with different bits dedicated to respectively indicating whether different system information components will differ between the changed system information 16B and the current system information 16A. FIG. 6A shows one example of these embodiments.

A bitmap 30 in FIG. 6A includes 7 bit positions labeled 30A-30G. A "1" bit value in a certain bit position indicates that a system information component mapped to that bit position will differ between the changed system information 16B and the current system information 16A. Assuming the system information 16 comprises system information components in the form of a MIB, SIB1, and SIB2-6, for example, the first bit position 30A indicates changes to the MIB, the second bit position 30B indicates changes to SIB1, and the remaining bit positions 30C-30G indicate changes to SIB2-SIB6, respectively. The example bitmap in FIG. 6 therefore notifies a device 14 about upcoming changes in SIB2 and SIB6.

Alternatively or additionally, the notification 18 includes a so-called component-specific value tag for each system information component that will differ between the changed system information 16B and the current system information 16A. A component-specific value tag for a given component (e.g., an SI message or SI block) is associated with a certain version of that component, e.g., the tag changes as the component changes over different versions. The current system information 16A in this regard includes a value tag for each system information component, so as to indicate the current version of that component. Specifying value tags for finer-grained components (e.g., SIBs) indicates system information changes on a finer granularity than specifying value tags for coarser-grained components (e.g., SI messages), e.g., so as to stay off reading of non-interesting finer-grained components. Regardless, to indicate which components will differ, the notification 18 includes for each of those differing components a value tag that differs from the value tag included for that component in the current system information 16A.

In some embodiments, such as those shown in FIG. 6B, the notification 18 includes the component-specific value tags 34-1 ... 34-X that will later be included in the changed system information 16B (when eventually broadcasted)v. A device 14 effectively reads these value tags 34-1 ... 34-X in advance by reading them in the notification 18. Once read from the notification 18, the device 14 compares the tags 34-1 ... 34-X to the component-specific value tags 32-1 ... 32-X that are or were included in the current system information 16A. If a component's tag 34-x in the notification 18 differs from the component's tag 32-x in the current system information 16A, the device 14 determines that the component 16-x will differ between the changed system information 16B and the current system information 16A.

In still other embodiments, the approaches shown in FIGS. 6A and 6B are combinable. The notification 18 may for instance be generated to include a bitmap and/or value tags, as needed on a static, semi-static, or dynamic basis.

Note that the notification 18 may selectively indicate only certain types of changes to system information 16. For example, the notification 18 may not indicate changes in certain dynamic parameters, e.g., in the MIB, such as the system frame number (or the most significant bit of it). Similarly, where the notification includes the bitmap 30 in FIG. 6A, the notification 18 in some embodiments does not indicate a change to a component if the only change to that component is to its value tag (e.g., upon expiration of the validity of that tag). For example, changes only to a MIB-specific value tag (also referred to as a systemInfoValueTag) and/or to SIB-specific value tags in SIB1 may not be indicated as a change in the bitmap 30 for the MIB and SIB1 (i.e., bit positions 30A and 30B for MIB and SIB1 respectively would not be set to 1 if only value tags are changed).

In some embodiments, a wireless communication device 14 exploits the notification's indication that a portion of the system information 16 remains unchanged in order to improve the performance of reading the changed system information 16B; that is, when the device 14 determines to read that changed information 16B to at least some extent. In one embodiment, for example, system information 16 includes scheduling information indicating in which radio resources different system information components are broadcasted. In this case, responsive to determining that the notification 18 does not indicate that the scheduling information included in the changed system information 16B differs from the scheduling information included in the current system information 16A (apart from any value tags for instance), the device 14 reads one or more components of the changed system information 16B using the scheduling information included in the current system information 16A. That is, the device 14 exploits the known scheduling information to read (e.g., soft combine and/or decode) component(s) of the changed system information 16B, rather than relying on the scheduling information in the changed system information 16B itself. This way, for example, the device 14 need not delay reading components of the changed system information 16B until after decoding the scheduling information in the changed system information 16B.

As another example, a device 14 in some embodiments reads the changed system information 16B by performing channel estimation using a portion of the changed system information 16B indicated by the notification 18 as not differing from a corresponding portion of the current system information 16A. In one sense, then, the non-changed portion(s) of the changed system information 16B serve as pilot or reference signals since they are "known" to the device 14. In one scenario, for instance, a device 14 may determine to update value tags from MIB/SIB1 of the changed system information 16B. When doing this, the decoding process of the MIB/SIB1 in some embodiments utilizes the knowledge that only the value tag fields (and potentially other dynamic information) were changed. This could for example be used in the channel estimation algorithm so as to use the non-changed bits as pilots or reference signals.

Figure 7:
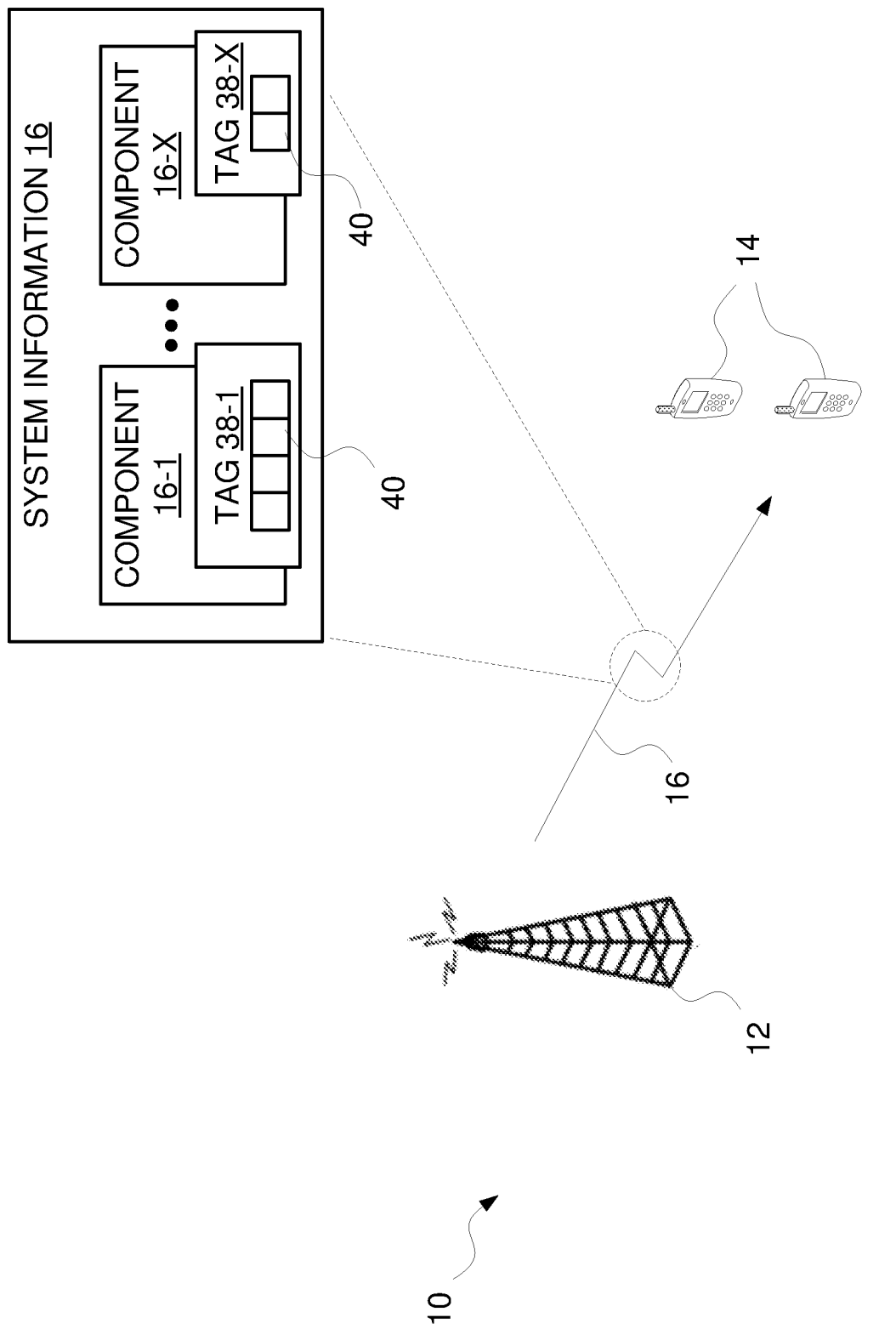
FIG. 7 is a block diagram of a wireless communication system that includes a radio network node and a wireless communication device according to other embodiments.
Figure 8:
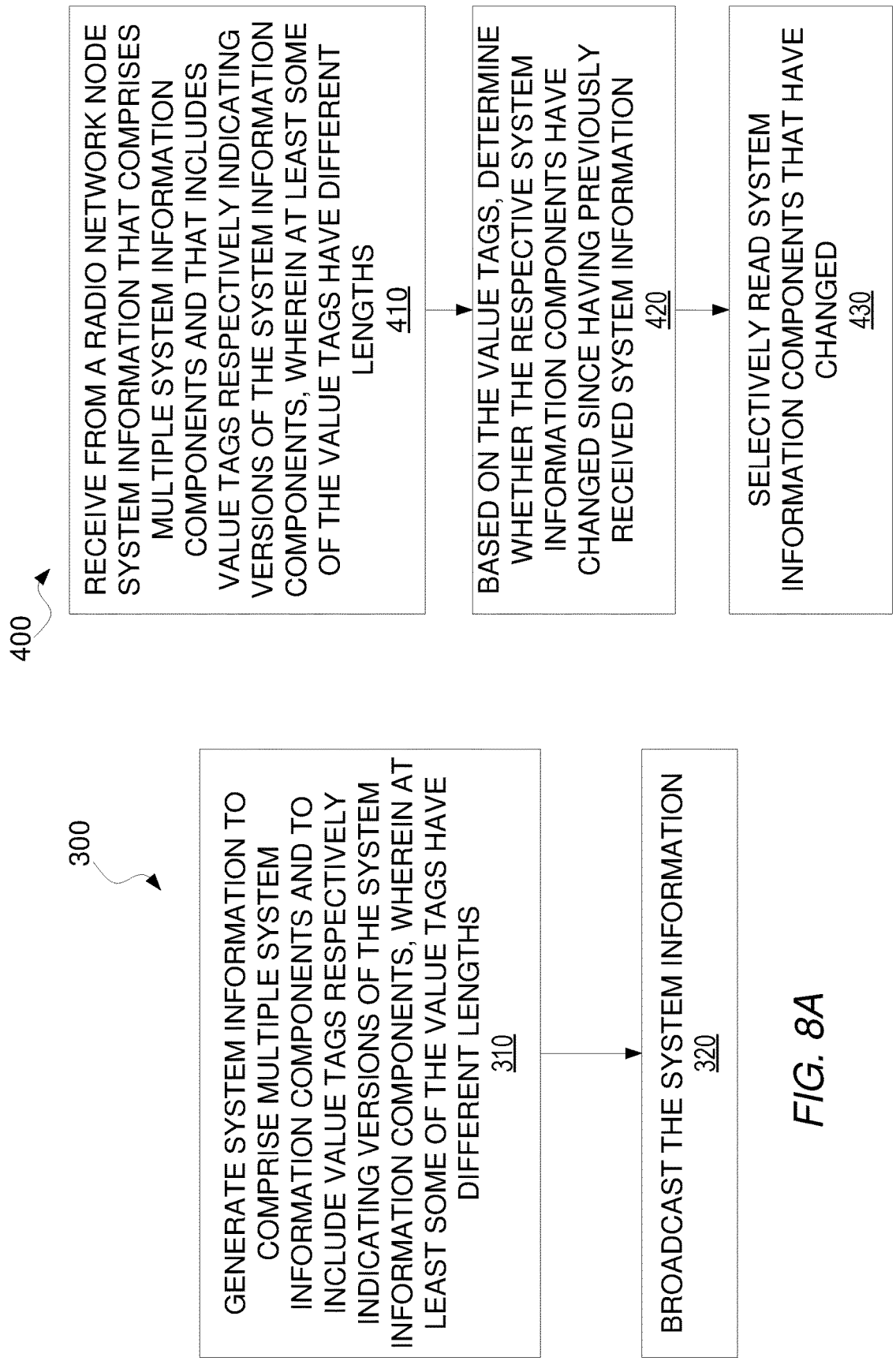
FIG. 8A is a logic flow diagram of a method performed by a radio network node according to some embodiments.
FIG. 8B is a logic flow diagram of a method performed by a wireless communication device according to some embodiments.

Alternatively or additionally, FIGS. 7 and 8A-8B collectively illustrate other embodiments herein for notifying wireless communication devices 14 in the system 10 about a change to system information 16. FIG. 7 illustrates the radio network node 12, devices 14, and system information 16 according to these embodiments, while FIGS. 8A-8B illustrate processing respectively performed by the radio network node 12 and a device 14.

As shown in FIG. 8A, the radio network node 12 generates system information 16 to comprise multiple system information components 16-1 ... 16-X and to include value tags 38-1 ... 38-X respectively indicating versions of the system information components 16-1 ... 16-X (Block 310).

Different versions of the same system information component 16-x differ from one another in terms of the component's content. A change in a given system information component 16-x therefore yields a different version of that component 16-x, as indicated by the component's value tag. For example, a component's value tag 38-x may be incremented each time the component is changed.

Regardless, the radio network node 12 generates the system information (and the tags included therein) such that at least some of the value tags 38-1 . . . 38-X have different lengths. FIG. 7 in this regard shows two tags 38-1 and 38-X as having different lengths in terms of the number of information units 40 (e.g., bits or symbols) with which the tags are respectively represented (e.g., the tags have different bit lengths). The radio network node 12 broadcasts the system information as generated in this way (Block 320).

FIG. 8B illustrates corresponding processing 400 implemented by a wireless communication device 14. As shown, a device 14 receives from the radio network node 12 system information 16 that comprises multiple system information components 16-1 . . . 16-X and that includes value tags 38-1 . . . 38-X respectively indicating versions of the system information components 16-1 . . . 16-X (Block 410). At least some of the value tags have different lengths. Based on the value tags 38-1 . . . 38-X, the device 14 determines whether the respective system information components 16-1 . . . 16-X have changed since having previously received system information 16 (Block 420). The device selectively reads system information components 16-1 . . . 16-X that have changed (Block 430).

For example, the device 14 reads only those system information components 16-1 . . . 16-X that have changed, but refrains from reading any system information components that have not changed. In some embodiments, for instance, a device 14 stores the value tags of system information messages it reads. Upon reading new system information 16 later, the device 14 can compare the value tags included in the new system information and conclude whether a change has taken place in any system information messages that are of interest and thus if reading of broadcast information is necessary. Note that the value tags may only be valid during a validity time not specified herein.

In at least some embodiments, the ability to broadcast system information 16 with value tags of different lengths facilitates the tailoring of those lengths in a way that conserves radio resources. In one or more embodiments, for example, a system information component 16-x that is changed more often has a longer tag length than a system information component 16-y that is changed less often. The shorter length tag in this regard may consume fewer radio resources to signal than the longer length tag. The shorter length tag may not be able to represent as many versions of its system information component 16-y; that is, the possible values that the tag may take on will be fewer than a longer tag. This may prove acceptable though depending on how often the component 16-y is changed in version.

Indeed, upon a version change of a component in some embodiments, the component's value tag is updated with one of the multiple possible values in a limited set of possible values. In one embodiment, the possible values are ordered and applied according to that order in a cyclical fashion. The possible values repeat or wrap around after a certain number of version changes. Any given value expires after a defined validity time. In such embodiments, the tag lengths are defined in a way so as to reduce the possibility that a value tag would wrap around within the defined validity time. That is, a value tag's length is defined long enough to provide a sufficient number of possible values to prevent a situation where the tag's component goes through as many version changes as there are possible tag values within the defined validity time. Regardless, different tag lengths may yield an opportunity to balance radio resource conservation with the need for frequency system information component changes.

In fact, in some embodiments, at least one of the value tags 38 has a length of zero. In this case, a device 14 need not read the tag's corresponding system information component upon, e.g., receiving a change notification and/or at modification period boundaries. Instead, the device 14 may simply need to read the system information component under certain conditions, e.g., that occur less frequently. Such conditions may be for instance the entering into a new cell or the expiration of a validity timer defined for the tag (e.g., 24 hours).

In one or more embodiments, the tag lengths are configurable on a semi-static or dynamic basis, e.g., according to the system operator's needs. That is, the length of one or more of the tags may be varied or otherwise changed from time to time. Each tag's length may be flexible in an unqualified manner, or alternatively capped at a defined maximum length (e.g., 5 bits). In an NB-IoT context, for example, NB-IoT has a configurable amount of bits per SI value tag up to the same amount of bits as in systemInfoValueTag in the MIB (i.e. up to 5 bits).

In some of these embodiments, the collective length of the value tags is configurable as well, meaning that each tag's length is variable without bound or limitation. In other embodiments, though, the collective length of the value tags is fixed or otherwise limited, such that the tags share that collective length. Accordingly, in these embodiments, the tags have respective lengths that are configurable, subject to the value tags collectively having a defined length that is shared amongst the value tags.

With the tag lengths variable or configurable, the radio network node 12 in at least some embodiments transmits (e.g., broadcasts) tag length information to one or more wireless communication devices 14. This tag length information indicates lengths of the value tags 38-1 . . . 38-X included in the system information 16. The radio network node 12 may do so for instance upon a change in the tag lengths. In some embodiments, though, the tag length information is included in the system information 16 itself, e.g., as part of a system information message (e.g., SIB1) that conveys scheduling information indicating in which radio resources system information components are respectively broadcasted.

Figure 9:
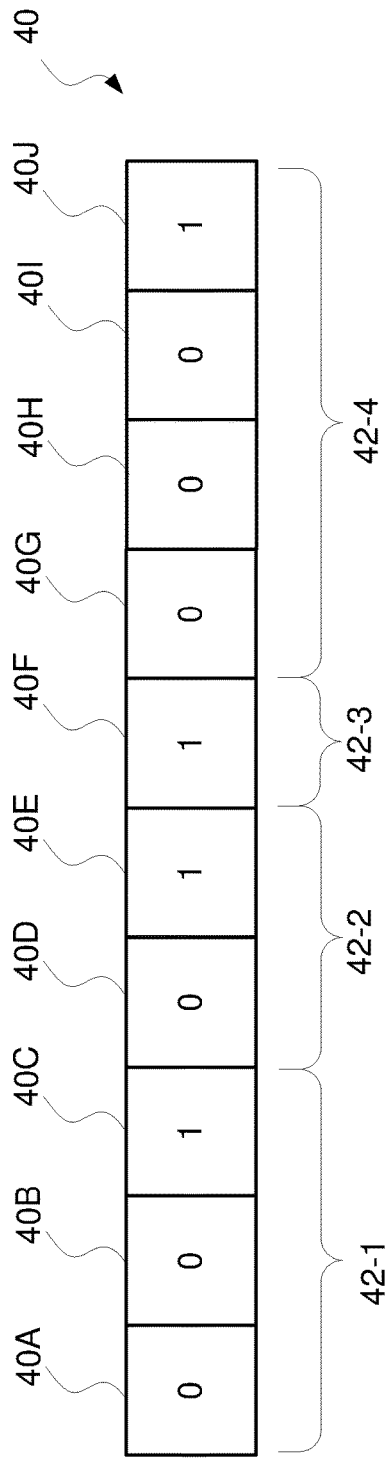
FIG. 9A is a block diagram of a bitmap indicating tag lengths that are variable or configurable according to some embodiments.
FIG. 9B is a block diagram of a table indicating configurations for tag lengths according to other embodiments.

The radio network node 12 represent the tag length information in any number of ways. FIG. 9A illustrates one example where the system information components 16-1 . . . 16-X (e.g., messages or blocks) are successively ordered. In this case, the tag length information comprises a bitmap 40 of 10 bits (although any number of bits may be used), where these 10 bits are shared by the components' tags. This shared bit pool may also be referred to as SIvalueTagBitBank. The bitmap 40 has different successive sections 42-1, 42-2, 42-3, and 42-4 marked off by a marker bit value (shown in FIG. 9A as the bit value of "1"). The bit lengths of the successive sections 42-1, 42-2, 42-3, and 42-4 of the bitmap 40 indicate respective lengths of the successively ordered system information components 16-1 . . . 16-X.

As an example, assume that the bit length of the first section 42-1 defines the length of the value tag for system information component 1, the bit length of the second section 42-2 defines the length of the value tag for system information component 2, the bit length of the third section 42-3 defines the length of the value tag for system information component 3, and the bit length of the fourth section 42-4 defines the length of the value tag for system information component 4. Based on the position of the marker bit at bit positions 40C, 40E, 40F, and 40J, this means system information component 1 has a length of 3 bits, system information component 2 has a length of 2 bits, system information component 3 has a length of 1 bit, and system information component 4 has a length of 4 bits.

Note that less than 10 bits could be used in this example since after the next-to-last section 42, a device 14 can assume that the remaining bits are meant to configure the amount of bits for last component's value tag. In case the configuration is known to have a fixed length, then actually SIvalueTagBitBank—1 bits (9 bits in the example) are enough to provide the information; this implies that both the radio network node and the devices 14 know that the configuration is always 9 bits. In case the configuration is of variable length (requires a length indicator), then even less bits are possible; for example 6 bits as outlined in FIG. 9A.

FIG. 9B illustrates a different example. As shown in FIG. 9B, a table 44 includes multiple different tag length configurations 46 that are defined as being possible in the system 10. The table 44 in FIG. 9B illustrates 24 different possible configurations, but more or less configurations may be specified. Each configuration 46 specifies a length for each component-specific value tag, e.g., tags 1-4 which may correspond to system information messages 1-4. Entry 48 in the table 44 for instance specifies that tag4 has a length of 1 for configuration number 3. According to embodiments exemplified by FIG. 9B, therefore, the tag length information may comprise an index into a table 44 defining different possible tag length configurations of the system information components 16-1 . . . 16-X. Of course, some permutations in this table 44 of FIG. 9B may be removed so that the table size is smaller, e.g., 16 indices in total rather than all permutations so that 4 bits can be used to address the whole table.

Alternatively, the tag length information may comprise, for each system information component, a value of a variable in a function that defines a length of the tag value for that system information component. Consider a few examples.

In one example, the actual number of bits assigned to each SI value tag is specified by the value of the variable. For instance, the number of bits to assign to a given SI value tag is specified by signaling the value of n, where the number of bits to assign=n, e.g., SI1: 4 bits, SI2: 3 bits, etc. is signaled as n=4 for SI1, n=3 for SI2, etc.

In other examples, the number of bits assigned to each SI value tag is specified in steps (consuming less bits in the configuration). In a first example, the value of n is signaled for each SI value tag, but the number of bits to assign is equal to 1 if n==0 or is equal to n×2 for other values of n. In this case, signaling SI1: n='1', SI2: n='0', SI3: n='2' specifies SI1: =2 bits, SI2: 1 bit, SI3: '2'×2=4 bits. In a second example, the value of n is signaled for each SI value tab, but the number of bits to assign is equal to n×2+1. In this case, signaling SI1: n='0', SI2:n='0', SI3: n='1' specifies SI1: '0'×2+1=1 bit, SI2: 1 bit, SI3: '1'×2+1=3 bits.

A function in this regard may also permit a tag length of zero, as alluded to above. If the configuration method example above (specifying actual numbers in steps) is followed, then such a configuration could be as follows: SI1: '1', SI2: '0', SI3: '2', etc. where the actual amount of bits is 'n'×2. This would mean SI1: '1'×2=2 bits, SI2: '0'×2=0 bits, SI3: '2'×2=4 bits according to this example.

Embodiments herein may be implemented separately or in combination. In combination, for example, value tags as described with respect to FIGS. 7 and 8A-8B may be included within the notification 18 described with respect to FIGS. 1 and 2A-2B. Indeed, in one embodiment, a device 14 already knows the component-specific value tags and their lengths from scheduling information and configuration (e.g., SIvalueTagBitBank configuration) included in previously broadcasted system information 16 (e.g., read when camping on a cell). This means that the device 14 is able to interpret the value tags in the notification 18 with the correct lengths. For example, assume that a device reads the SIvalueTagBitBank configuration when camping on the cell and the configuration is as depicted in FIG. 9A. Assume then that the notification 18 (e.g., paging message) related to SI update contains the following SIs value tag 1010110100. This implies the following tag lengths: SI1: 101→tag=3, SI2: 01→tag=1, SI3: 1→tag=1, SI4: 0100→tag=4. The device 14 can then compare the tags to the stored ones and derive which SI component has changed.

Note that some embodiments herein were illustrated within the context of a certain number or type of system information components, e.g., SIBs. Note that more SIBs might become relevant, e.g. there are ongoing discussions around an access barring SIB14 and perhaps a SIB containing positioning info. However, embodiments herein may be expanded to cover more (or less) SIBs and SIs than the examples.

In at least some embodiments, the radio network node 12 and wireless communication devices 14 operate according to narrowband Internet of Things (NB-IoT) specifications. In this regard, embodiments described herein are explained in the context of operating in or in association with a RAN that communicates over radio communication channels with wireless communication devices, also interchangeably referred to as wireless terminals or UEs, using a particular radio access technology.

More specifically, embodiments are described in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. Narrowband Internet of Things (NB-IoT) is a 180 KHz bandwidth system being developed for cellular internet of things by 3GPP. The system is based on existing LTE systems and addresses optimised network architecture and improved indoor coverage for massive number of devices with following characteristics: low throughput devices (e.g. 2 Kbps), low delay sensitivity (~10 seconds), ultra-low device cost (below 5 dollars), low device power consumption (battery life of 10 years).

In order to reach extended coverage, an NB-IoT base station will repeat its downlink (DL) data transmission towards NB-IoT user equipment (UE) in a cell. In unicast type of communication, the amount of repetition from the base station (also called eNB hereafter) is adapted to the needs of a certain UE based on agreement. However, for broadcast type of transmission, as the eNB needs to assure proper reception by the UE experiencing worst coverage in a cell, maximum amount of repetition is used in the DL.

The MIB in NB-IoT contains the systemInfoValueTag; serving as an identifier of the broadcast contents. Upon a change of the broadcast system information, the value of systemInfoValueTag is updated. This update can be any value change and does not necessarily mean single-step increment or decrement. The systemInfoValueTag is a common identifier for all the SIBs (other than NB-IoT Access Barring SIB and positioning info SIB which are currently FFS).

A UE entering a cell not visited earlier may start reading system information by first capturing the MIB, then SIB1, and then the remainder of the SIBs with the help of information provided in SIB1. The UE may store a cell's SIB contents together with the MIB systemInfoValueTag. Later, in case the UE wants to check if there has been any system information update compared to the stored information, the UE can capture the broadcasted MIB. If the newly captured systemInfoValueTag has been updated (compared to the stored systemInfoValueTag), the UE heretofore needs to re-capture all system information. Note that systemInfo-ValueTag has a limited range and is only valid for a limited time. This limited range is most probably 5 bits (32 possible values) as in legacy LTE. I.e. the NW has the possibility to update SI 32 times before reusing the values. This limited time may be up to 24 hours and may be configurable by the network.

It shall be noted that as a result of the narrowband characteristics of the NB-IoT system and the low throughput it provides, the data reception time by the UE and hence battery consuming radio-on time is much longer than existing systems such as LTE per bit received. This reception process is especially costly for a UE in deep coverage in need of data repetition and/or low coding rate. In case one wants to achieve the many-year battery life time requirement mentioned above, it is imperative that unnecessary data reception by the UE is avoided. In order to remedy a similar issue for Rel-13 eMTC, it was agreed to (in addition to the common systemInfoValueTag) introduce an optionally broadcast value tag per SI message in the scheduling information residing in SIB1 to efficiently notify UE about upcoming changes with finer granularity rather than just using one common value tag (systemInfoValueTag). Note that in eMTC and legacy LTE, the common systemInfo-ValueTag resides in SIB1 compared to NB-IoT MIB.

Even if SI value tags would be introduced for NB-IoT, still some problems remain if the same approach is taken as in eMTC.

Most probably companies will have the same concerns as for eMTC, namely that as few bits as possible shall be broadcast due to scarce system resources rather than allowing the full range per SI value tag as for the common systemInfoValueTag in the MIB. As a result, the SI-specific value tag's range of say 2 bits implies that a specific SI message can only change 4 times within the SI validity time (up to 24 hours) before there is an SI-specific value tag wraparound.

Also, another problem is that some SI contents rarely change at all and are not in need of having 2 bits per value tag, leading to unnecessary bits broadcast.

Yet another problem is that regardless of introduction of SI-specific value tags, still upon a paging notification to the UE in a cell due to SI update, the UEs need first to capture the MIB and then the SIB1 to read the scheduling information inside to detect that the specific SI that has been updated is not of interest for the UE resulting in that battery power is wasted. For example, the change is perhaps related to data needed for accessing the cell whereas the UE has currently no intention to access the cell.

Another example is when a UE wants to start transmitting at the same time as the SI update related to neighbor cell relations occurs in a cell. If the UE is in good coverage and not interested in updates of neighboring cell relations, it still has to capture the broadcasted MIB and SIB1 as it does not otherwise know the details of the updates. In addition to the wasted battery, and due to the half-duplex nature of the UE, unnecessary delay is added to the transmission process.

Embodiments herein address these problems. Some embodiments herein for example already in the SI update notification message indicate which SIBs (or SIs) are to be changed. This information is then used by the UE in a cell as the UE can immediately go back to sleep and avoid SI reading in case the update relates to contents that are not of interest at that moment.

Further, as a part of the scheduling message, some embodiments herein suggest to have the possibility to configure the amount of bits per SI/SIB-specific value tag. By having this, the operator can tailor the amount of bits per value tag according to its SI update needs rather than having one-size-fits-all (for SIs) and without wasting a lot more resources compared to the current solution used for eMTC.

For example, in some NB-IoT embodiments, there is a configurable amount of bits per SI value tag up to the same amount of bits as in systemInfoValueTag in MIB (i.e. up to 5 bits). By doing so, an operator can configure the system according to its needs; SI messages changing often could for example be configured to have 5 bits value tag, whereas other SI messages would have fewer bits configured.

Various advantages of these embodiments for example include improved battery life to NB-IoT devices upon SI update, improved latency in cases when transmission collides with SI update which is not of interest for the UE), and the possibility for the operator to tailor the amount of bits per value tag according to its SI update needs without wasting a lot more resources than currently designed for eMTC.

However, despite this particular applicability to NB-IoT, it will be appreciated that the techniques may be applied to other wireless networks, including eMTC as well as to successors of the E-UTRAN. Thus, references herein to signals using terminology from the 3GPP standards for LTE should be understood to apply more generally to signals having similar characteristics and/or purposes, in other networks.

A radio network node 12 herein is any type of network node (e.g., a base station) capable of communicating with another node over radio signals. A wireless communication device 14 is any type device capable of communicating with a radio network node 12 over radio signals. A wireless communication device 14 may therefore refer to a machine-to-machine (M2M) device, a machine-type communications (MTC) device, a NB-IoT device, etc. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device 14 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that the radio network node 12 as described above may perform the processing herein by implementing any functional means or units. In one embodiment, for example, the radio network node 12 comprises respective circuits or circuitry configured to perform the steps shown in FIGS. 2A and/or 8A. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 10:
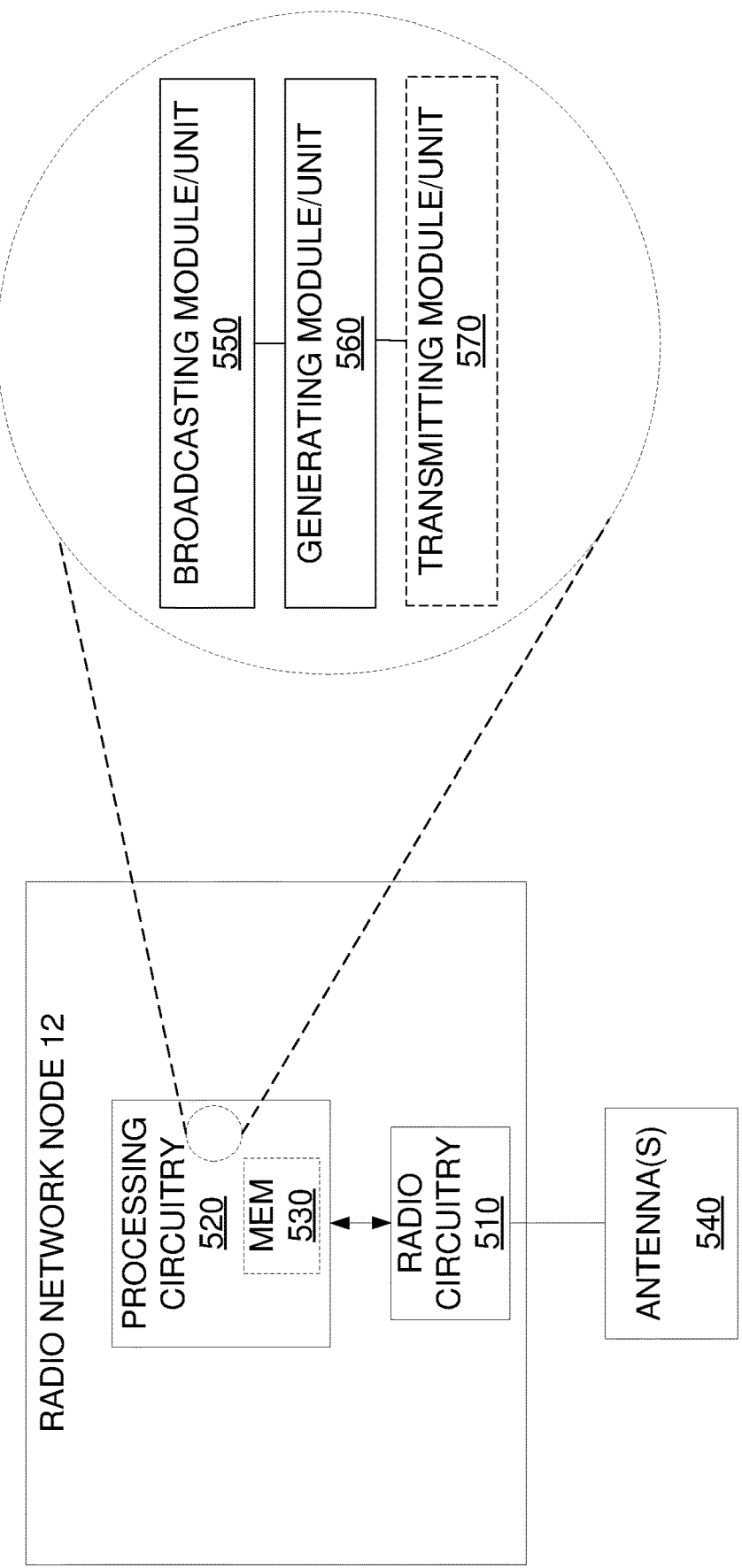
FIG. 10 is a block diagram of a radio network node according to some embodiments.

FIG. 10 illustrates additional details of a radio network node 12 in accordance with one or more embodiments. As shown, the radio network node 12 includes processing circuitry 520 and radio circuitry 510. The radio circuitry 510 is configured to transmit via one or more antennas 540. The processing circuitry is configured to perform processing described above, e.g., in FIG. 2A and/or FIG. 8A, such as by executing instructions stored in memory 530. The processing circuitry 520 in this regard may implement certain functional means or units.

For example, the radio network node 12 in some embodiments implement various functional means or units, e.g., via the processing circuitry 520. These functional means or units, e.g., for implementing the method in FIG. 2A, include for instance a broadcasting module 550 for broadcasting current system information. Further included is a generating module 560 for generating a notification indicating that changed system information will be broadcasted, wherein the notification is generated to indicate how the changed system information will differ from the current system information. The radio network node 12 also includes a transmitting module 570 for transmitting the notification. The broadcasting module 550 may also be for, after transmitting the notification, broadcasting the changed system information.

In other embodiments, the radio network node 12 implements other functional means or units, e.g., for implementing the method of FIG. 8A. For example, the radio network node 12 includes a generating module 560 for generating system information to comprise multiple system information components and to include value tags respectively indicating versions of the system information components, wherein at least some of the value tags have different lengths. The radio network node 12 in such case further includes a broadcasting module 550 for broadcasting the system information.

The wireless communication device 14 as described above may perform the processing herein by implementing any functional means or units. In one embodiment, for example, the wireless communication device 14 comprises respective circuits configured to perform the steps shown in FIG. 2B and/or FIG. 8B. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 11:
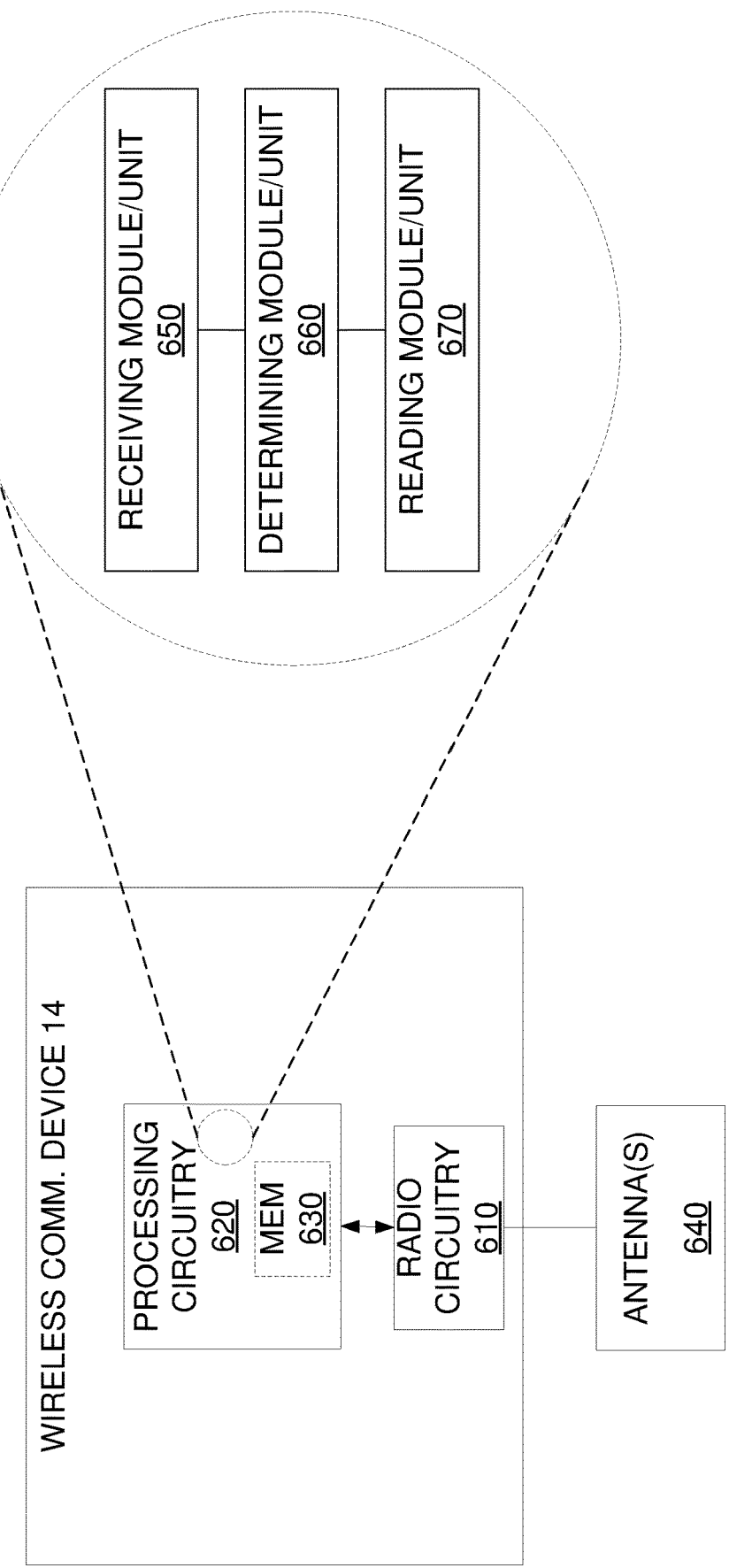
FIG. 11 is a block diagram of a wireless communication device according to some embodiments.

FIG. 11 illustrates additional details of a wireless communication device 14 in accordance with one or more embodiments. As shown, the wireless communication device 14 includes processing circuitry 620 and radio circuitry 610. The radio circuitry 610 is configured to transmit via one or more antennas 640. The processing circuitry is configured to perform processing described above, e.g., in FIG. 2B and/or FIG. 8B, such as by executing instructions stored in memory 630. The processing circuitry 620 in this regard may implement certain functional means or units.

For example, the wireless communication device 14 in some embodiments implement various functional means or units, e.g., via the processing circuitry 620. These functional means or units, e.g., for implementing the method in FIG. 2B, include for instance a receiving module 650 for receiving current system information broadcasted from a radio network node, and for receiving a notification indicating that the radio network node will broadcast changed system information, and indicating how the changed system information will differ from the current system information. Further included is a determining module 660 for determining, based on the notification, an extent to which the wireless communication device will read the changed system information when broadcasted. Also included is a reading module 670 for selectively reading the changed system information to the determined extent.

In other embodiments, the wireless communication device 14 implements other functional means or units, e.g., for implementing the method of FIG. 8B. For example, the wireless communication device 14 includes a receiving module for receiving from a radio network node system information that comprises multiple system information components and that includes value tags respectively indicating versions of the system information components, wherein at least some of the value tags have different lengths. Further included is a determining module for, based on the value tags, determining whether the respective system information components have changed since having previously received system information. Also included is a reading module for selectively reading system information components that have changed.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Those skilled in the art will recognize that the present invention may be carried out in other ways than those specifically set forth herein without departing from essential characteristics of the invention. The present embodiments are thus to be considered in all respects as illustrative and not restrictive.

What is claimed is:

1. A wireless communication device configured for operation in a wireless communication system, the wireless communication device comprising:
   radio circuitry; and
   processing circuitry configured to:
      receive, via the radio circuitry, current system information broadcasted from a radio network node;
      receive, via the radio circuitry, a notification indicating that changed system information will be broadcasted, and indicating how the changed system information will differ from the current system information, wherein the current system information and the changed system information each include scheduling information indicating radio resources in which different system information components are broadcasted;
      determine, based on the notification, an extent to which the wireless communication device will read the changed system information when broadcasted;
      selectively read the changed system information to the determined extent; and
      in responsive to determining that the notification does not indicate that the scheduling information included in the changed system information differs from the scheduling information included in the current system information, read one or more components of the changed system information using the scheduling information included in the current system information.

2. The wireless communication device of claim 1, wherein the processing circuitry is configured to selectively read the changed system information by reading the changed system information only when it is determined to read the changed system information to at least some extent, and refraining from reading the changed system information when it is determined to not read the changed system information to any extent.

3. The wireless communication device of claim 1, wherein the current system information and the changed system information includes multiple different system information components, wherein the notification indicates that only some of the multiple different system information components differ between the current system information and the changed system information, and wherein the processing circuitry is configured to determine to read only said some of the multiple different system information components that are indicated by the notification as differing between the current system information and the changed system information.

4. The wireless communication device of claim 1, wherein the processing circuitry is configured to:
   determine one or more types of system information indicated by the notification as differing between the changed system information and the current system information; and
   determine which, if any, of the one or more types of system information are desired types of system information in which the wireless communication device has an interest in updating; and
   determine to read only the desired types of system information, if any.

5. The wireless communication device of claim 1, wherein the processing circuitry is configured to read the changed system information by performing channel estimation using a portion of the changed system information indicated by the notification as not differing from a corresponding portion of the current system information.

6. The wireless communication device of claim 1, wherein the current system information and the changed system information each comprise multiple different system information components, and wherein the notification indicates which one or more system information components will differ between the current system information and the changed system information.

7. The wireless communication device of claim 6, wherein the notification includes a bitmap with different bits dedicated to respectively indicating whether different system information components will differ between the current system information and the changed system information.

8. The wireless communication device of claim 6, wherein the current system information includes, for each system information component, a value tag associated with a current version of that system information component, and wherein the notification includes, for each system information component that will differ between the current system information and the changed system information, a value tag that differs from the value tag included for that system information component in the current system information.

9. The wireless communication device of claim 8, wherein at least some of the value tags for respective system information components have different lengths.

10. The wireless communication device of claim 6, wherein the current system information and the changed system information each comprise multiple different system information messages as the multiple different system information components, wherein each system information message includes one or more system information blocks.

11. The wireless communication device of claim 6, wherein the current system information and the changed system information each comprise multiple different system information blocks as the multiple different system information components, wherein each system information block is included in one of multiple different system information messages.

12. The wireless communication device of claim 1, wherein the current system information and the changed system information each comprise a master information block, and wherein the notification indicates whether the master information block will differ between the current system information and the changed system information.

13. The wireless communication device of claim 1, wherein the wireless communication system is a narrowband Internet of Things, NB-IoT, system or an enhanced machine type communication, eMTC, system.

14. A radio network node configured for notifying wireless communication devices in a wireless communication system about an upcoming change of broadcasted system information, the radio network node comprising:
   radio circuitry; and
   processing circuitry configured to:
      broadcast current system information via the radio circuitry;
      generate a notification indicating that changed system information will be broadcasted, wherein the notification is generated to indicate how the changed system information will differ from the current system information, wherein the current system information, wherein the current system information and the changed system information each include scheduling information indicating radio resources in which different system information components are broadcasted;

transmit the notification via the radio circuitry, wherein the notification from the radio network node enabling the wireless communication device to read one or more components of the changed system information using the scheduling information included in the current system information, in responsive to determining that the notification does not indicate that the scheduling information included in the changed system information differs from the scheduling information included in the current system information; and after transmitting the notification, broadcast the changed system information via the radio circuitry.

15. The radio network node of claim 14, wherein the current system information and the changed system information each comprise multiple different system information components, and wherein the notification indicates which one or more system information components will differ between the current system information and the changed system information.

16. The radio network node of claim 15, wherein the notification includes a bitmap with different bits dedicated to respectively indicating whether different system information components will differ between the current system information and the changed system information.

17. The radio network node of claim 15, wherein the current system information includes, for each system information component, a value tag associated with a current version of that system information component, and wherein the notification includes, for each system information component that will differ between the current system information and the changed system information, a value tag that differs from the value tag included for that system information component in the current system information.

18. A method implemented by a wireless communication device configured for operation in a wireless communication system, the method comprising:

receiving current system information broadcasted from a radio network node;

receiving a notification indicating that the radio network node will broadcast changed system information, and indicating how the changed system information will differ from the current system information, wherein the current system information and the changed system information each include scheduling information indicating radio resources in which different system information components are broadcasted;

determining, based on the notification, an extent to which the wireless communication device will read the changed system information when broadcasted;

selectively reading the changed system information to the determined extent; and in responsive to determining that the notification does not indicate that the scheduling information included in the changed system information differs from the scheduling information included in the current system information, reading one or more components of the changed system information using the scheduling information included in the current system information.

\* \* \* \* \*